Jan. 15, 1924.  1,481,086
C. L. FITZ
FILM REELING MECHANISM
Filed Nov. 3, 1922  4 Sheets-Sheet 1

Witness:
John Enders

Inventor:
CHARLES L. FITZ,
by Robert Burns
Atty.

Jan. 15, 1924.  
C. L. FITZ  
1,481,086  
FILM REELING MECHANISM  
Filed Nov. 3, 1922   4 Sheets-Sheet 2
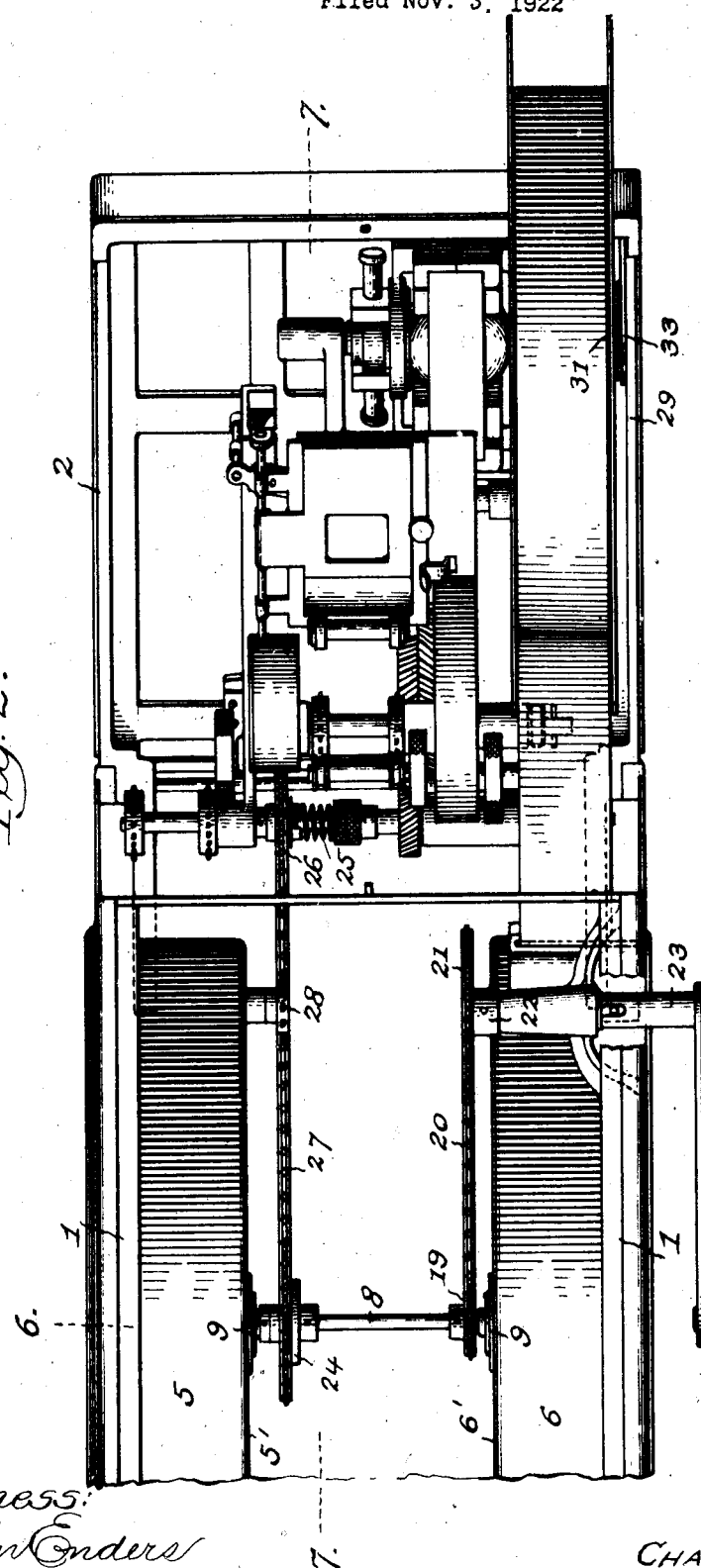
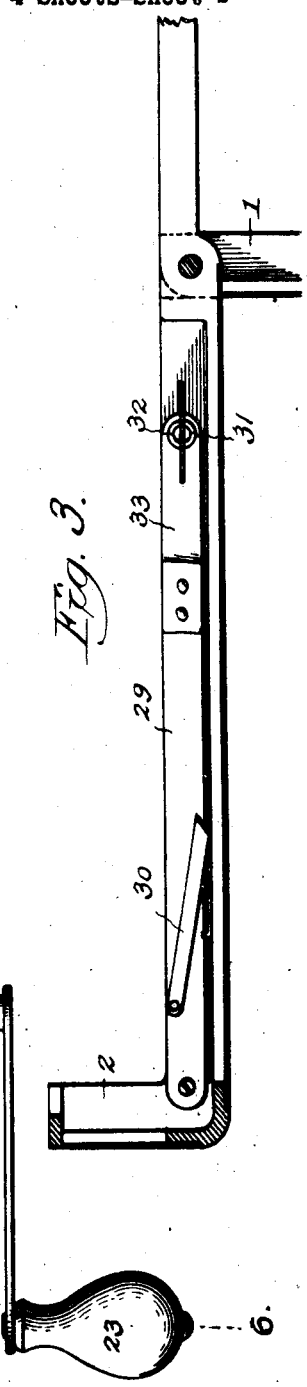
Witness:
John Enders
Inventor:
CHARLES L. FITZ,
by Robert Burns,
Atty.

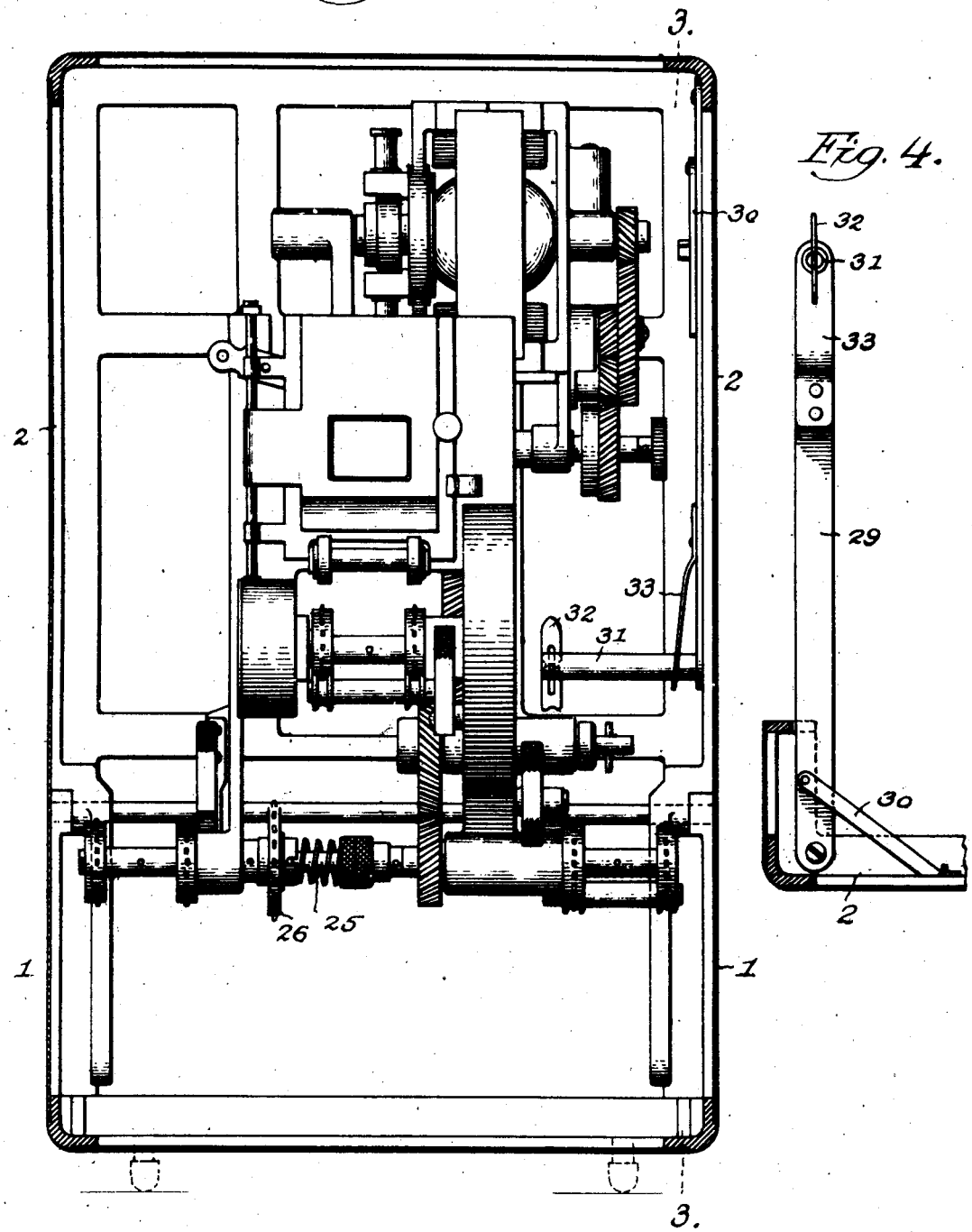

Jan. 15, 1924.  
C. L. FITZ  
1,481,086
FILM REELING MECHANISM
Filed Nov. 3, 1922  4 Sheets-Sheet 4
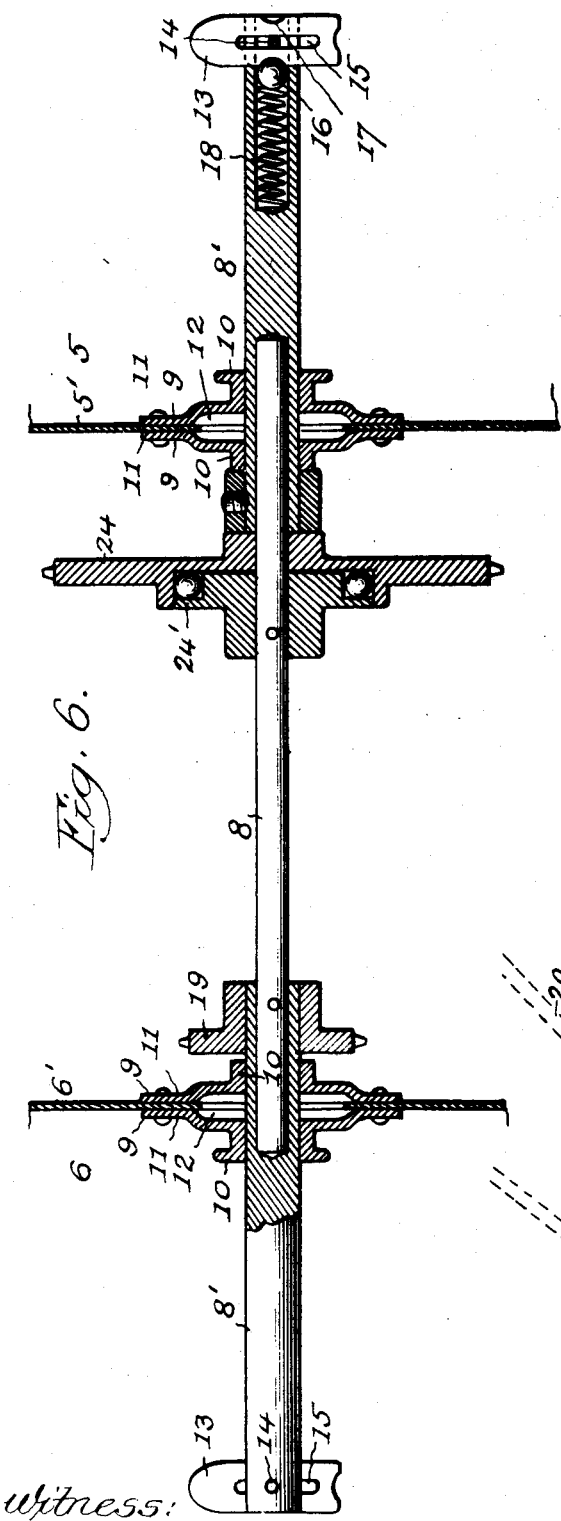
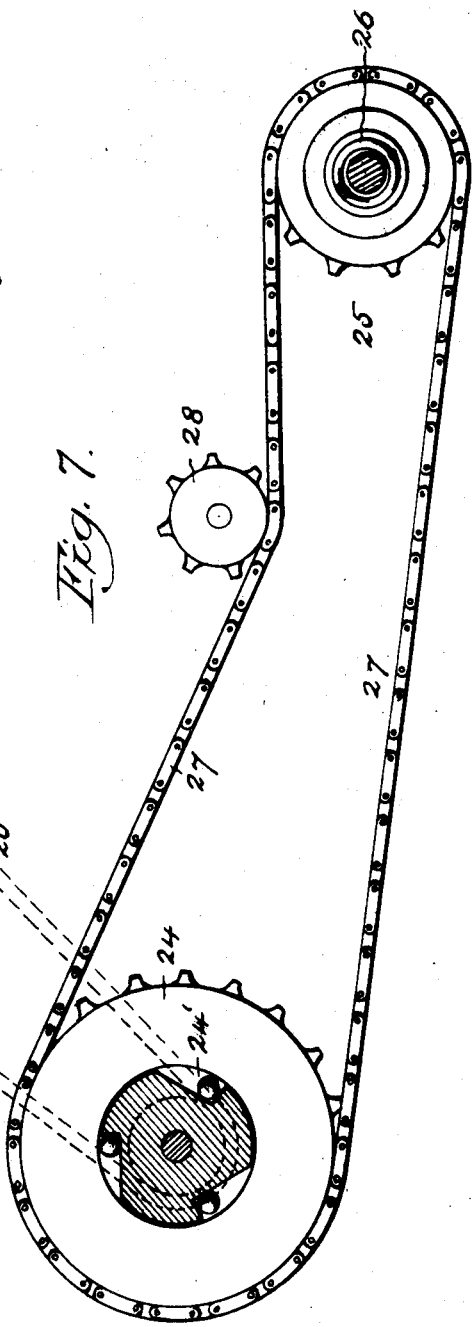
Witness:
John Enders
Inventor
CHARLES L. FITZ,
by Robert Burns
Atty.

Patented Jan. 15, 1924.

1,481,086

UNITED STATES PATENT OFFICE.

CHARLES LEO FITZ, OF FOND DU LAC, WISCONSIN, ASSIGNOR TO DROP HEAD PROJECTOR COMPANY, OF FOND DU LAC, WISCONSIN, A CORPORATION OF WISCONSIN.

FILM-REELING MECHANISM.

Application filed November 3, 1922. Serial No. 598,865.

*To all whom it may concern:*

Be it known that I, CHARLES L. FITZ, a citizen of the United States, residing at Fond du Lac, in the county of Fond du Lac and State of Wisconsin, have invented certain new and useful Improvements in Film-Reeling Mechanisms, of which the following is a specification.

This invention relates to the film reeling mechanisms for the portable class of motion picture machines, and more especially to the type of such machines which constitute the subject matter of the McMillan Letters Patent Nos. 1,326,407 and 1,326,410, dated December 30th, 1919, and the present improvement has for its various objects:

To provide a simple and convenient means for effecting a rewinding of the picture film after an exhibition of the same from the take-up reel and its magazine upon a substitute film reel in the proper direction ready for a subsequent exhibition of the picture film.

To provide a structural formation and association of the carrying shafts of the film supply and film take-up reels adapted to admit of the ready alternate operations of feeding the picture film to the exhibiting means of the machine, and the subsequent of rewinding the exhibited film in the proper direction for a subsequent exhibition of said film, and with which an effective and proper lubrication of the bearings for said shaft is afforded.

To provide a simple and efficient means for holding the film reels in place upon their carrying shafts in a manner capable of ready operation to release the film reels when required, all as will hereinafter more fully appear.

In the accompanying drawings:

Fig. 2, is a detail plan view of the machine as above described.

Fig. 3, is a detail longitudinal section on line 3—3, Fig. 5, of the folding reel support in a closed condition.

Fig. 4 is a companion view to Fig. 3, showing the folding reel support in an operative position.

Fig. 5, is an enlarged transverse section on line 5,—5, Fig. 2, with the mechanism in position for a picture exhibiting operation.

Fig. 6, is an enlarged detail transverse section on line 6,—6, Fig. 2, of the driving connection between the film feeding and the film reeling mechanism of the machine.

Fig. 7, is an enlarged detail section on line 7—7, Fig. 2, of the driving connections between the film feeding and film reeling mechanisms of the machine.

Like reference numerals indicate like parts in the several views.

Figure 1:
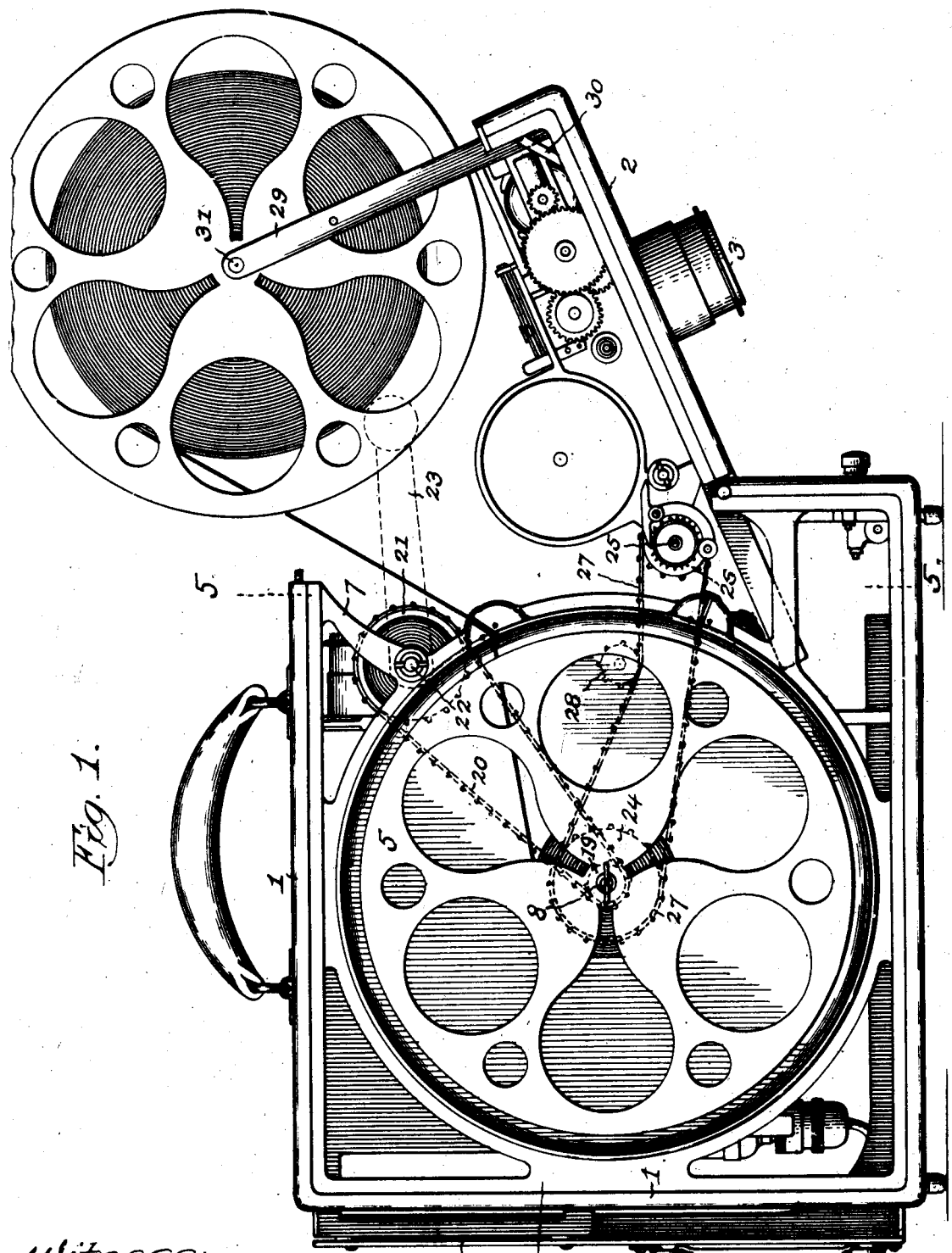
Fig. 1, is a side elevation of a motion picture machine embodying the present invention, a forward side panel of the enclosing casing being removed to disclose the enclosed mechanisms, and with the parts in position for a film rewinding operation.

Referring to the drawings, 1 designates the main enclosing shell or casing of the usual rectangular form, in the interior of which are mounted the film feeding and the film reeling mechanisms of a motion picture machine. The shell or casing 1 is preferably of the type described in the aforesaid McMillan Patents Nos. 1,326,407 and 1,326,410, in which the upper forward portion 2 is hinged at its lower end to the main portion of the casing 1 to constitute a drop-head upon which is mounted the light controlling shutter, the objective 3 and the film feeding mechanism of the machine. In connection with the described arrangement of parts, the rear end of the main portion of the casing 1 is adapted to receive the longitudinally adjustable lamp house 4 of the machine.

5 and 6 designate the reel housings of the machine, fixedly supported within the casing 1 in transverse spaced relation by individual longitudinally arranged frames 7 preferably of the skeleton form described in detail in my companion application for Patent Serial No. 598,868, filed Nov. 3, 1922. The housings 5, 6 are of the usual cylindrical form, and have closed inner ends or heads 5', 6', and open outer ends for the introduction of the film reels into place. In the present improvement each inner head is provided with a journal bearing for the transverse carrying shaft 8 of the film reels, as follows:—

9 designates companion hub members arranged at the respective sides of an end head 5' or 6' and formed with central bearing sleeves 10 and cup shaped attaching flanges 11, the cavities of which in connection with an orifice of a corresponding size in said end walls, provide a closed containing chamber 12 for a supply of lubricating material in which the shaft 8 turns, as illustrated more particularly in Fig. 6.

The reel shaft 8 aforesaid, is preferably of a sectional three part formation adapted for convenient assemblage of the machine parts, and comprising a middle shaft section 8 and a pair of outer shaft sections 8' telescopically connected to the respective ends of the middle shaft section 8 as shown in Fig. 6, and secured together in proper assembled relation by the transverse pins by which the hereinafter described operating sprocket wheels of the reel shaft are secured thereto.

13 designates latch bars pivoted at their mid-lengths in longitudinal slots in the respective ends of the reel shaft by means of transverse pins 14 in the shaft ends and elongated slots 15 in the bars 13 as shown.

16 designates latch pieces, preferably of the spherical shape shown, moving in longitudinal recesses in the ends of the reel shaft and adapted to engage notches 17 in the mid-length of the bars 13 to yieldingly hold said bars against movement from their right angle relation to the shaft, and to such end springs 18 are associated with said latch pieces 16 to hold the same to the described engagement. When it is desired to apply or remove a film reel from the shaft, the particular latch bar 13 is drawn by hand in a direction transverse to the shaft to the limit of the pin and elongated slot connection aforesaid, after which the bar 13 is swung into a position longitudinal with the shaft to permit an application or removal of the film reel, and with an application of the film reel said latch bar 13 is returned to the normal position above described.

19 designates a sprocket wheel fixedly mounted on the shaft 8 and having endless chain connection 20, with a sprocket wheel 21 on an operating crank shaft 22 journalled in the upper portion of the main casing 1, with its handle or crank 23 arranged outside said casing for convenient manual actuation. This arrangement of parts affords means for imparting rotation to a film reel arranged in the film supply housing or magazine, in the operation of rewinding a picture film after an exhibition, as hereinafter more fully set forth.

24 designates a sprocket wheel on the reel shaft 8 and connected thereto by a ratchet clutch 24' preferably of the ball type shown, and adapted to impart positive rotation in one direction only to said shaft and to the film take-up reel in the operation of the machine during a motion picture exhibition, and thus permit of the film rewinding operation above referred to, with a rotation of the shaft 8 in an opposite direction without impedance on the part of the sprocket wheel 19 and its operative connections now to be described.

25 designates the transversely arranged carrying shaft of the film supply and film take-up sprocket drums of a motor driven film feeding and exhibiting mechanism, preferably of the structural formation and arrangement set forth in my companion application for patent Serial No. 598,866, filed Nov. 3, 1922.

26 designates a sprocket wheel frictionally mounted on the shaft 25, preferably in the detail manner set forth in said companion application Serial No. 598,866, and operatively connected to the aforesaid sprocket wheel 24 of the reel shaft by an endless chain 27 as shown in Figs. 1, 2, and 7.

28 designates an idler sprocket wheel mounted on an adjacent reel housing or magazine and adapted to engage a length of the endless chain 27 and take up the slack in said chain when the drop front portion 2 of the main casing 1 is lowered.

29 designates a post or standard pivoted at one end and at one side of the drop front portion 2 of the casing 1 and adapted to fold down into said drop front portion when not in use.

30 designates a hinged brace associated with the post or standard 29 and adapted to engage and hold the same in a raised position for actual use.

31 designates a transversely extending shaft or arbor secured to the free ends of the post or standard 29 and adapted to support a film reel in line with the film supply housing or magazine and a film reel arranged therein. Said shaft 31 is provided at its free end with a latching means, 32 similar to the latch mechanisms of the reel shaft, for confining a film reel in place on said shaft or arbor 31.

33 designates a spring associated with the attached end of the shaft 31, and adapted to force a film reel mounted on said shaft, yieldingly towards the latching means 32 and thus provide frictional resistance against a too free rotation of the film reel.

In use, the film reel from a take-up housing or magazine of the machine with the picture film wound on said reel in reversed order, is placed upon the shaft 31 and the end of the picture film then threaded through the supply housing or magazine and connected to a film reel mounted therein. By a rotation of the crank shaft 23 aforesaid, the picture film is rewound upon the last-mentioned film reel with the series of pictures in regular sequence ready for a subsequent exhibition.

Having thus fully described my invention what I claim as new and desire to secure by Letters Patent is:—

1. In a motion picture machine having a drop front portion hinged at its lower end to the enclosing casing of the machine, the combination of a pair of reel carrying housings arranged in transverse spaced relation in said casing, a transverse reel carrying shaft common to said housings, a post hinged to said drop front portion and having a shaft at its free end adapted to support a film reel in line with one of said housings, and means for imparting rotation to the reel carrying shaft of said housings and to a reel carried thereon to attain a rewinding of the picture film from one reel to the other.

2. In a motion picture machine having a drop front portion hinged at its lower end to the enclosing casing of the machine, the combination of a pair of reel carrying housings arranged in transverse spaced relation in said casing, a transverse reel carrying shaft common to said housings, a post hinged to said drop front portion and having a shaft at its free end adapted to support a film reel in line with one of said housings, a hinged brace attached to said post and adapted to hold the same in a raised position, and means for imparting rotation to the reel carrying shaft of said housings and to a reel carried thereon to attain a rewinding of the picture film from one reel to the other.

3. In a motion picture machine having a drop front portion hinged at its lower end to the enclosing casing of the machine, the combination of a pair of reel carrying housings arranged in transverse spaced relation in said casing, a transverse reel carrying shaft common to said housings, a post hinged to said drop front portion and having a shaft at its free end adapted to support a film reel in line with one of said housings, a crank shaft mounted in the machine casing and adapted for manual actuation, a sprocket wheel on said crank shaft, a companion sprocket wheel on the reel carrying shaft of the housings, and an endless chain connecting said sprocket wheels.

4. In a motion picture machine having a drop front portion hinged at its lower end to the enclosing casing of the machine, the combination of a pair of reel carying housings arranged in transverse spaced relation in said casing, a transverse reel carrying shaft common to said housings, a post hinged to said drop front portion and having a shaft at its free end adapted to support a film reel in line with one of said housings, a hinged brace attached to said post and adapted to hold the same in a raised position, a crank shaft mounted in the machine casing and adapted for manual actuation, a sprocket wheel on said crank shaft, a companion sprocket wheel on the reel carrying shaft of the housings, and an endless chain connecting said sprocket wheels.

5. In a motion picture machine having a drop front portion hinged at its lower end to the enclosing casing of the machine and supporting the intermittent film feeding mechanism and the transversely aligned film supply and film take-up sprocket drums of the machine, the transverse carrying shaft of said drums having adjacent relation to the hinge connection of the drop front portion, a pair of reel housings arranged in transverse spaced relation in the machine casing, a transverse reel carrying shaft common to said housings, a sprocket wheel on said shaft and connected thereto by ratchet means affording positive driving connection in one direction, a sprocket wheel frictionally mounted on the shaft of the supply and take-up drums aforesaid, and an endless chain connecting said sprocket wheels.

6. In a motion picture machine having a drop front portion hinged at its lower end to the enclosing casing of the machine and supporting the intermittent film feeding mechanism and the transversely aligned film supply and film take-up sprocket drums of the machine, the transverse carrying shaft of said drums having adjacent relation to the hinge connection of the drop front portion, a pair of reel housings arranged in transverse spaced relation in the machine casing, a transverse reel carrying shaft common to said housings, a sprocket wheel on said shaft and connected thereto by ratchet means affording positive driving connection in one direction, a sprocket wheel frictionally mounted on the shaft of the supply and take-up drums aforesaid, an endless chain connecting said sprocket wheels, a post hinged to said drop front portion and having a shaft at its free end adapted to support a film reel in line with one of said housings, and manual means for imparting rotation to the reel carrying shaft of said housings and to a reel carried thereon to attain a rewinding of the picture film from one reel to the other.

7. In a motion picture machine having a drop front portion hinged at its lower end to the enclosing casing of the machine and supporting the intermittent film feeding mechanism and the transversely aligned film supply and film take-up sprocket drums of the machine, the transverse carrying shaft of said drums having adjacent relation to the hinge connection of the drop front portion, a pair of reel housings arranged in transverse spaced relation in the machine casing, a transverse reel carrying shaft common to said housing, a sprocket wheel on said shaft and connected thereto by ratchet means affording positive driving connection in one direction, a sprocket wheel frictionally mounted on the shaft of the supply and take-up drums aforesaid, an endless chain connecting said sprocket wheels, an idler wheel engaging said chain connection midway its length, a post hinged to said drop front portion and having a shaft at its free end adapted to support a film reel in line with one of said housings, and manual means for imparting rotation to the reel carrying shaft of said housings and to a reel carried thereon to attain a rewinding of the picture film from one reel to the other.

8. In a motion picture machine the combination of an enclosing casing, a pair of reel housings arranged in transverse spaced relation in said casing and having open outer ends and closed inner ends, a reel carrying shaft common to both housings, and bearings for said shaft comprising pairs of cup shape hub members secured to the webs forming the closed ends of the housings and providing lubricant containing chambers for the shaft bearings.

9. In a motion picture machine, the combination of an enclosing casing, a pair of reel housings arranged in transverse spaced relation in said casing and having open outer ends and closed inner ends, a sectional reel carrying shaft comprising a central section and a pair of outer sections telescopically connected to the central section, and bearings for said outer shaft sections comprising flanged hubs secured to the webs forming the closed ends of said housings.

10. In a motion picture machine, the combination of an enclosing casing, a pair of reel housings arranged in transverse spaced relation in said casing and having open outer ends and closed inner ends, a sectional reel carrying shaft comprising a central section and a pair of outer sections telescopically connected to the central section, and bearings for said outer shaft sections comprising pairs of cup shaped hub members secured to the webs forming the closed ends of the housings and providing lubricant containing chambers for the shaft bearings.

11. In a motion picture machine, the combination of a reel carrying shaft having a longitudinally slotted end, and a longitudinal bore adjacent to said slotted end, a latch bar pivoted at its mid-length in said slotted end by a pin and elongated slot connection, a bearing piece moving in said longitudinal bore and adapted for engagement with an edge of the latch bar, and a spring in said bore adapted to force said bearing piece against the latch bar.

12. In a motion picture machine, the combination of a reel carrying shaft having a longitudinally slotted end, and a longitudinal bore adjacent to said slotted end, a latch bar pivoted at its mid-length in said slotted end by a pin elongated slot connection, a bearing piece of a spherical shape moving in said longitudinal bore and adapted for engagement with an edge of the latch bar, and a spring in said bore adapted to force said bearing piece against the latch bar.

Signed at Fond du Lac, Wis., this 30th day of October, 1922.

CHAS. LEO FITZ.